(No Model.)

G. H. ZIPH.
COMBINATION TOOL.

No. 301,039. Patented June 24, 1884.

WITNESSES

INVENTOR
George H. Ziph.
by Anderson & Smith
his Attorneys

UNITED STATES PATENT OFFICE.

GEORGE H. ZIPH, OF ST. JOSEPH, MISSOURI.

COMBINATION-TOOL.

SPECIFICATION forming part of Letters Patent No. 301,039, dated June 24, 1884.

Application filed August 16, 1883. (No model.)

*To all whom it may concern:*

Be it known that I, GEORGE H. ZIPH, a citizen of the United States, residing at St. Joseph, in the county of Buchanan and State of Missouri, have invented certain new and useful Improvements in Compound Tools, of which the following is a specification, reference being had to the accompanying drawings, and to the letters of reference marked thereon, in which—

Figure 1:
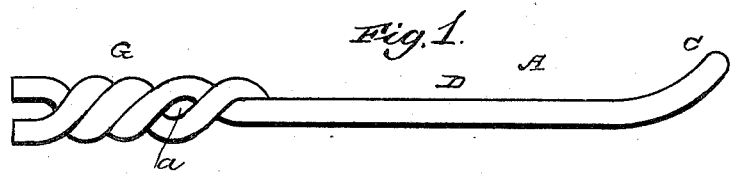
Figure 2:
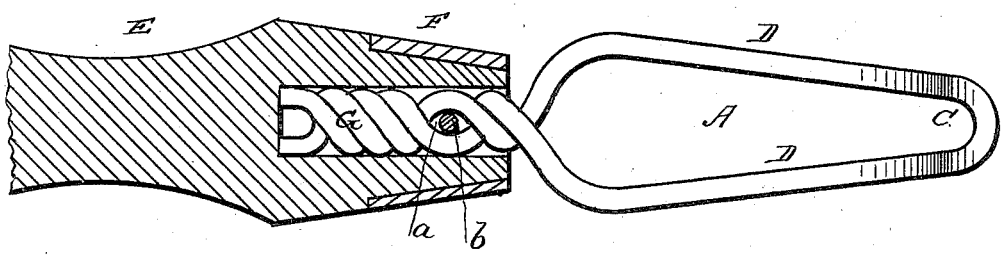
Figure 3:
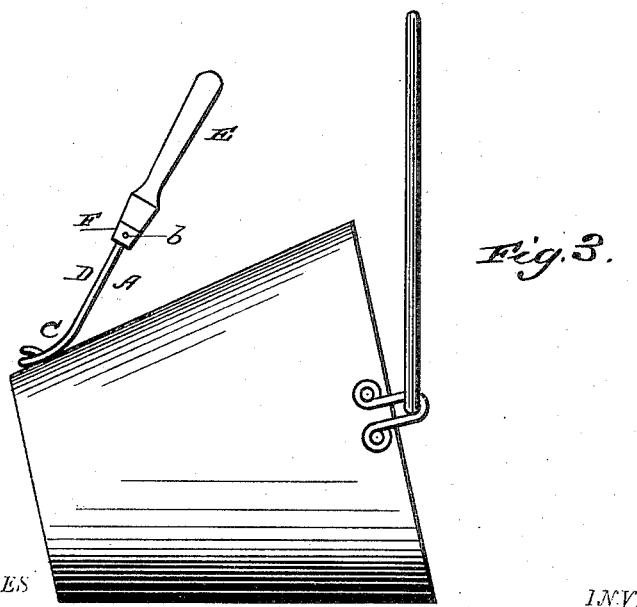

Figure 1 is a representation of a side elevation of my device with the handle removed. Fig. 2 is a plan view of the same with a portion of the handle in longitudinal section; and Fig. 3 is a side view of my tool complete, showing the same applied to a vessel in a tilting position.

This invention has relation to improvements in compound tools, and has for its object to provide a device which will serve the twofold purpose of a stove-lid lifter and means for tilting vessels provided with a hook on their outer walls.

The improvements consist in the construction and novel arrangement of parts, as will be hereinafter more fully set forth, and particularly pointed out in the claim.

In the said drawings, A indicates the wire part of my device, which is composed of suitable-sized wire. This wire is bent about midway its length, and a sufficient portion of its free ends brought together and spirally twisted to form a shank, G. A suitable opening is left between the wires in the twisted shank to admit of a rivet or pin to key it into the handle, as shown at $a$. After the shank has been inserted into a ferruled handle, as shown in Fig. 2, the rivet or pin $b$ is passed through the ferrule, the handle, and the twisted shank, thus securing the shank in the handle. The handle is indicated by E, and the ferrule by F, both of which may be of any approved construction. The arms D D converge forwardly from the base of the twisted shank to their outer or loop end, where they are bent upwardly and forwardly, as shown at $c$. By this construction it will be perceived that when the loop end is inserted in the recess of a stove-lid the hand of the operator is not brought close to the heated lid, but the handle is carried off in a position oblique to the face of the lid or wall of the vessel to which it is applied, as shown in Fig. 3.

The device being made of wire it will not absorb enough of heat to overheat or burn the wooden handle.

When the device is applied to a handled vessel having a hook on its outer lower wall, as shown in Fig. 3, the convex portion of the outer loop end will engage the vessel in such a manner as to prevent the hand being burned by the vessel or the steam rising from its contents.

I am aware that a stove-lid lifter has been formed of a piece of wire looped to form the arms, with a crook at their outer loop ends, and having a twisted shank with two tines to be inserted into a wooden handle, and therefore do not claim such construction broadly; but,

Having thus described my invention, what I claim as new, and desire to secure by Letters Patent, is—

The combination, with the wooden handle, having a central longitudinal recess in its forward end, of the wire having its free ends spirally twisted with the opening $a$ for the passage of the pin $b$, whereby the said shank is secured in the handle, the outer portion of the wire looped, as shown, and bent upwardly and forwardly at its outer end, substantially as specified.

In testimony that I claim the above I have subscribed my name in presence of two witnesses.

GEORGE H. ZIPH.

Witnesses:
SILAS R. OWEN,
AUGUST RUDOLPH.